United States Patent [19]

Pollet et al.

[11] Patent Number: 4,604,325

[45] Date of Patent: Aug. 5, 1986

[54] NON-AQUEOUS COATING FOR GLASS FIBERS AND GLASS FIBERS COATED THEREWITH

[75] Inventors: Jean-Claude Pollet, Granville; Gordon P. Armstrong, Newark; Martin C. Flautt, Granville, all of Ohio

[73] Assignee: Owens-Corning Fiberglas Corporation, Toledo, Ohio

[21] Appl. No.: 732,777

[22] Filed: May 10, 1985

[51] Int. Cl.[4] .................. B32B 17/10; C08K 5/01
[52] U.S. Cl. .................... 428/391; 428/417; 523/206; 523/437; 523/465
[58] Field of Search ......... 523/437, 465; 524/488; 428/391, 417

[56] References Cited

U.S. PATENT DOCUMENTS

| 4,539,364 | 9/1985 | Pollet et al. | 524/488 |
| 4,567,102 | 1/1986 | Pollet et al. | 428/391 |
| 4,581,392 | 4/1986 | Pollet et al. | 523/209 |

*Primary Examiner*—Lewis T. Jacobs
*Attorney, Agent, or Firm*—Ronald C. Hudgens; Patrick P. Pacella

[57] ABSTRACT

Non-aqueous coatings for glass fibers consist essentially of a cycloaliphatic epoxy resin, an ethylene-ethylacrylate copolymer, a microcrystalline wax, a phenolic-modified terpene resin, and an organosilane. Glass fibers coated with the composition of the present invention are suitable for being utilized as reinforcement media for various polymeric resins including nylon, rubber modified styrene-maleic anhydride copolymer, acetal, and polybutyl terphthalate.

10 Claims, No Drawings

NON-AQUEOUS COATING FOR GLASS FIBERS AND GLASS FIBERS COATED THEREWITH

FIELD OF THE INVENTION

The present invention relates to non-aqueous coatings for glass fibers and, in particular, to hot melt coatings for glass fibers so that the glass fibers coated therewith can be utilized as a reinforcing media for various types of resin matrices to produce glass fiber-reinforced resin articles.

CROSS-REFERENCE TO RELATED APPLICATIONS

Further insight into hot melt coatings for glass fibers to which the present invention pertains can be gained by referring to commonly-owned and copending U.S. application Ser. Nos. 613,846 filed May 24, 1984, now U.S. Pat. No. 4,581,392, issued Apr. 8, 1986; U.S. Pat. No. 613,940 filed May 24, 1984, now U.S. Pat. No. 4,567,102, issued Jan. 28, 1986; and 732,778 filed even date herewith, each of which has been filed in the names of Jean-Claude Pollet, Gorden P. Armstrong and Martin C. Flautt (the entire disclosure of each application being expressly incorporated hereinto by reference).

BACKGROUND AND SUMMARY OF THE INVENTION

The use of coated (i.e., sized) glass fibers and their incorporation into various resins for reinforcing purposes is well known. Bare glass fibers are substantially smooth rod-like members having surfaces which are highly hydrophilic in nature and thus will not typically exhibit a bonding relationship with polymeric materials sufficient to provide reinforcement properties thereto. That is, the lack of bonding between the bare glass fibers and the polymeric material causes the glass fibers and the polymeric material to separate from one another and thus are not useful for the manufacture of glass fiber-reinforced products. It is conventional therefore to provide a thin layer of an aqueous size composition to the surfaces of the bare glass fibers which is compatible with and serves to improve the bonding relationship between the glass fibers and the polymeric material. Thus, glass fibers utilized for the reinforcement of resinous polymeric materials conventionally have an aqueous-based size applied to their surface and the fibers are then wound into a package. The packages are dried for the purpose of eliminating moisture after which the fibers can be used for reinforcement purposes, either in continuous lengths or as cut fibers in polymeric resin matrices such as nylon, acetal, polybutyl terephthalate and polypropylene.

Typically, it is necessary to employ a specially-formulated size composition in dependence upon the resin matrix in which the sized glass fibers will be dispersed as reinforcement media. The size formulations are thus specifically formulated so that the sized glass fibers will be compatible with the resin matrix in which they are dispersed. It would therefore save considerable processing expense owing to the requirement for separate formulations in dependence upon the desired resin matrix in which the coated glass fibers will be used, if a universal size formulation could be achieved which is functional in a variety of resin matrices. Moreover, it would be beneficial if a size could be employed which, while requiring no drying, could be directly blended into the resin and molded therewith to provide satisfactory reinforcement. Another important role of a size is to protect the glass fibers against abrasion and provide a strand of the desired integrity so as to avoid unwanted filamentation during handling. This is especially important for chopped glass used for compounding with thermoplastics as filamentized glass may create what is commonly called "fuzz" or "clumps" which, in turn, create problems in feeding to the extruder and in keeping a homogeneous blend. On the other hand, it is often desired that the strand filamentizes easily once it is incorporated into the molten thermoplastic. Complete filamentation results in a uniform dispersion of the glass filaments and in a homogeneous polymer/reinforcing fiber blend. Moreover, undispersed bundles of fibers may create surface or appearance defects in a molded part.

The requirements for a high strand integrity prior to incorporation into a polymer and good glass dispersion in the finished part are opposite in terms of formulation of an aqueous size, so aqueous size formulations are often the result of a compromise to obtain an acceptable balance of integrity and dispersability. It is therefore another purpose of this invention to significantly improve the dispersion of fibers in the polymer in order to obtain a homogeneous blend of polymer/reinforcing fibers and good appearance of the molded part and at the same time maintain or significantly improve the abrasion protection and the integrity of the glass strands before blending into the polymer. The present invention is directed to a solution to these problems.

According to the present invention, there is provided a non-aqueous hot melt coating for glass fibers consisting of a cycloaliphatic epoxy resin, an ethylene-ethyl acetate copolymer, a microcrystalline wax, a phenolic-modified terpene resin, and an organosilane. The invention relates to the discovery that the amino silane coupling agents, which have been observed to gel epoxy resins when combined in hot melts, are surprisingly non-gelling with cycloaliphatic epoxy resins at processing temperatures (i.e., 300°–400° F.) necessary to produce hot melt size compositions. Accordingly, amino-organosilane coupling agents which are typically necessary when formulating a coating for glass fibers can be utilized with cycloaliphatic epoxy resins so that the resulting coating will be compatible with a number of polymeric resins to achieve properties of a molded glass fiber-reinforced product which are comparable to the aqueous sizes specially formulated for the particular polymeric resins.

Further advantages of the present invention will become more clear after careful consideration is given to the detailed description of the preferred exemplary embodiments thereof which follows.

DETAILED DESCRIPTION OF THE PREFERRED EXEMPLARY EMBODIMENTS

Any suitable glass fiber is usable with the coatings of the present invention. The term "glass fibers" as used herein shall mean filaments formed by attenuation of one or more streams of molten glass and to strands formed when such glass fiber filaments are gathered together in forming. The term shall also mean yarns and cords formed by plying and/or twisting a multiplicity of strands together and to woven and non-woven fabrics which are formed of such glass fiber strands, yarns or cords. Preferably, the coating composition of the present invention is usable with E-type fibers having a diameter in the range of from about 0.35 to about 0.90 mil.

The resins employed in the practice of this invention are commercially available and can be simply blended with the other components in the preparation of the compositions embodying the features of the present invention.

The hot melt size of this invention is a 100% solids formulation applied as a hot melt to the glass fibers as they are formed, that is, at or about the place in their formation at which aqueous sizes are typically applied (e.g., between the bushing and the collet on which the fibers are wound as a package).

Any suitable cycloaliphatic epoxy resin can be employed in the successful practice of this invention. Preferably, the cycloaliphatic epoxy resin will have a viscosity of between 350 to 450 cps (25° C.), an apparent specific gravity at 25° C. of about 1.17, and an epoxy equivalent weight (grams/gram mol oxirane oxygen) of 131 to 143. Particularly preferred for the practice of this invention is 3,4-epoxycyclohexylmethyl-3,4-epoxycyclohexane carboxylate which is commercially available under the trade name ERL-4221 (Union Carbide Corporation). The cycloaliphatic epoxy resin is preferably employed in an amount between about 1.0 to about 30.0 parts by weight of the coating, and particularly between about 2.0 to about 15.0 parts by weight of the coating.

Any suitable organosilane coupling agent conventionally employed in aqueous based glass sizes can be employed in the successful practice of the present invention. Particularly preferred organosilanes are gamma-aminopropyltriethoxysilane (commercially available from Union Carbide Corporation under the tradename "A-1100"). The organosilane will preferably be employed in an amount between 0.1 to 4.0 parts by weight of the coating and preferably in an amount between about 0.5 to about 2.0 parts by weight.

Any suitable ethylene-ethylacrylate copolymer can be employed. Preferably, the copolymer will have a melt index (ASTM D1238 gram/10 minutes of about 20, a density of about 0.93 grams/cc, a flexural modulus and secant modulus of elasticity of about 9,000 and 4,300, respectively (determined on 0.075 inch compression molded placs), an ultimate elongation of about 750%, a tensile strength of about 700 psi and a Durometer Hardness "A" of about 86. The ethylene-ethylacrylate copolymer will be employed in an amount within the range of from about 5 to 35 parts by weight of the coating and preferably in an amount between about 15 to about 25 parts by weight. One suitable ethylene-ethylacrylate copolymer is Bakelite® DPDA-9169 commercially available from the Union Carbide Corporation of Danbury, CT.

Any suitable microcrystalline wax can be employed. Preferably, the wax will have a melting point of about 200° F., a penetration (ASTM D-1321 at 77° F.) of about 5 mm, a SUS viscosity (ASTM D-88 at 210° F.) of about 78, a viscosity (ASTM D-3236) of about 12 cps, and a specific gravity at 75° F. of about 0.93. The microcrystalline wax will preferably be included in the coating compositions of this invention in an amount within the range of from about 10 to 80 parts by weight of the coating and preferably in an amount between about 30 to about 50 parts by weight. One particularly suitable microcrystalline wax is Petrolite® C-1035 commercially available from Bareco®, a division of Petrolite Corporation of Tulsa, OK.

Any suitable phenolic-modified terpene resin can be employed. The resin should be highly alkylated, nonreactive, thermoplastic and methylol-free. Preferably also, the resin will have a Ring and Ball softening point of about 135° C., a viscosity at 25° C. (70% solids solution in toluene) of V, a density at 25° C. of about 8.6 lb/cu. ft., a flashpoint, COC, of about 515° F. and melt viscosities at 190° C. of about 10 poises. One particularly suitable resin is Piccofyn® A135 commercially available from Hercules, Inc., Wilmington, Delaware. The phenolic modified terpene resin will be incorporated in the coating compositions of this invention in an amount within the range of from about 5 to about 60 parts by weight of the coating and preferably in an amount between about 15 to about 25 parts by weight.

A particularly preferred coating composition consists, in approximate parts by weight (PBW), of the following:

|  | PBW |
| --- | --- |
| cycloaliphatic epoxy resin | 5.0 |
| ethylene-ethylacrylate copolymer | 23.0 |
| microcrystalline wax | 47.0 |
| phenolic-modified terpene resin | 23.0 |
| organosilane | 2.0 |
|  | 100.0 |

The hot melt size compositions of this invention are best produced by blending all materials in their liquid state with agitation. A uniform coating of 100% solids can then be applied to the glass fibers in any suitable manner. The glass can be drawn through a bath of the composition or the composition can be padded or rolled on. Preferably, the hot melt compositions of the present invention are applied to the surface of glass fibers in the manner described in copending U.S. application Ser. No. 613,847 filed May 24, 1984 (the entire disclosure thereof being expressly incorporated hereinto by reference). Glass fibers sized with the coatings of this invention are particularly suitable for reinforcing a variety of resins including nylon, rubber modified styrene-maleic anhydride copolymers, acetal, and polybutyl terephthalate.

While the present invention has been herein described in what is presently conceived to be the most preferred and exemplary embodiment thereof, those in this art may recognize that many modifications may be made hereof, which modifications shall be accorded the broadest scope of the appended claims so as to encompass all equivalent compositions and/or formulations.

We claim:

1. A nonaqueous coating for glass fibers consisting essentially of a cycloaliphatic epoxy resin, an ethylene-ethylacrylate copolymer, a microcrystalline wax, a phenolic-modified terpene resin, and an organosilane.

2. A coating as in claim 1 wherein said epoxy resin is a cyclohexylmethyl epoxy resin.

3. A coating as in claim 1 wherein said epoxy resin is 3,4-epoxycyclohexylmethyl-3,4-epoxycyclohexane carboxylate.

4. A coating as in claim 3 wherein said organosilane is gamma-aminopropyltriethoxysilane.

5. A coating as in claim 1 wherein said epoxy resin is present in an amount between about 1.0 to about 30.0 parts by weight.

6. A coating as in claim 1 consisting essentially of, in parts by weight (PBW), 1.0 to 30.0 PBW epoxy resin, 5 to 35 PBW ethylene-ethylacrylate copolymer, 10 to 80 PBW microcrystalline wax, 5 to 60 PBW phenolic-modified terpene resin, and 0.1 to 4.0 PBW organosilane.

7. A non-aqueous coating for glass fibers consisting essentially of, in parts by weight:

| | |
|---|---|
| cycloaliphatic epoxy resin | 5.0 |
| ethylene-ethylacrylate copolymer | 23.0 |
| microcrystalline wax | 47.0 |
| phenolic-modified terpene resin | 23.0 |
| organosilane | 2.0 |

8. A glass fiber including a coating thereon, which coating consists essentially of a cycloaliphatic epoxy resin, an ethylene-ethylacrylate copolymer, a microcrystalline wax, a phenolic-modified terpene resin, and an organosilane.

9. A glass fiber as in claim 8 wherein said epoxy resin is 3,4-epoxycyclohexylmethyl-3,4-epoxycyclohexane carboxylate.

10. A glass fiber as in claim 9 wherein said organosilane is gamma-aminopropyltriethoxysilane.

* * * * *